No. 883,553. PATENTED MAR. 31, 1908.
L. A. MAGOUT.
CHANGE SPEED AND REVERSING GEAR MECHANISM.
APPLICATION FILED FEB. 25, 1907.

3 SHEETS—SHEET 1.

Witnesses:

Inventor
Louis A. Magout
By James L. Norris
Atty

THE NORRIS PETERS CO., WASHINGTON, D. C.

No. 883,553. PATENTED MAR. 31, 1908.
L. A. MAGOUT.
CHANGE SPEED AND REVERSING GEAR MECHANISM.
APPLICATION FILED FEB. 25, 1907.

3 SHEETS—SHEET 2.

Witnesses: Inventor
Louis A. Magout
By James L. Norris.
Atty.

No. 883,553. PATENTED MAR. 31, 1908.
L. A. MAGOUT.
CHANGE SPEED AND REVERSING GEAR MECHANISM.
APPLICATION FILED FEB. 25, 1907.

3 SHEETS—SHEET 3.

Witnesses:

Inventor
Louis A. Magout
By
James L. Norris
Atty

UNITED STATES PATENT OFFICE.

LOUIS AUGUSTE MAGOUT, OF PARIS, FRANCE.

CHANGE-SPEED AND REVERSING-GEAR MECHANISM.

No. 883,553.  Specification of Letters Patent.  Patented March 31, 1908.

Application filed February 25, 1907. Serial No. 359,160.

*To all whom it may concern:*

Be it known that I, LOUIS AUGUSTE MAGOUT, citizen of the French Republic, residing at Paris, Department of Seine, France, and whose post-office address is 18 Rue de Vaucouleurs, in the said city, have invented certain new and useful Improvements in Change-Speed and Reversing-Gear Mechanism, of which the following is a specification.
This invention has for its object a change speed gear applicable to all transmissions of movement and which renders it possible to obtain in a continuous manner any speed comprised between zero and a maximum speed merely by the simultaneous transverse displacement of two pinions which are constantly in mesh, one of these being mounted loose on the driving shaft while the other is loose upon the driven shaft; a similar device permits of obtaining the reverse, that is to say the rotation in the opposite direction of the driven shaft. Further, the gear may be controlled by means of a single operating lever.
I will describe my invention in reference with the accompanying drawings, but I do not confine myself to the precise details herein inclosed.

Figure 1:
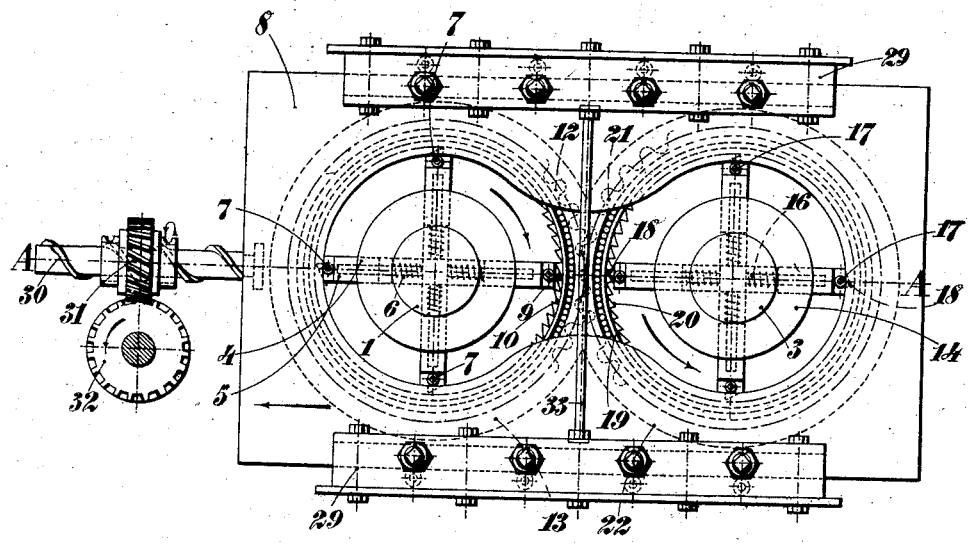
Figure 3:
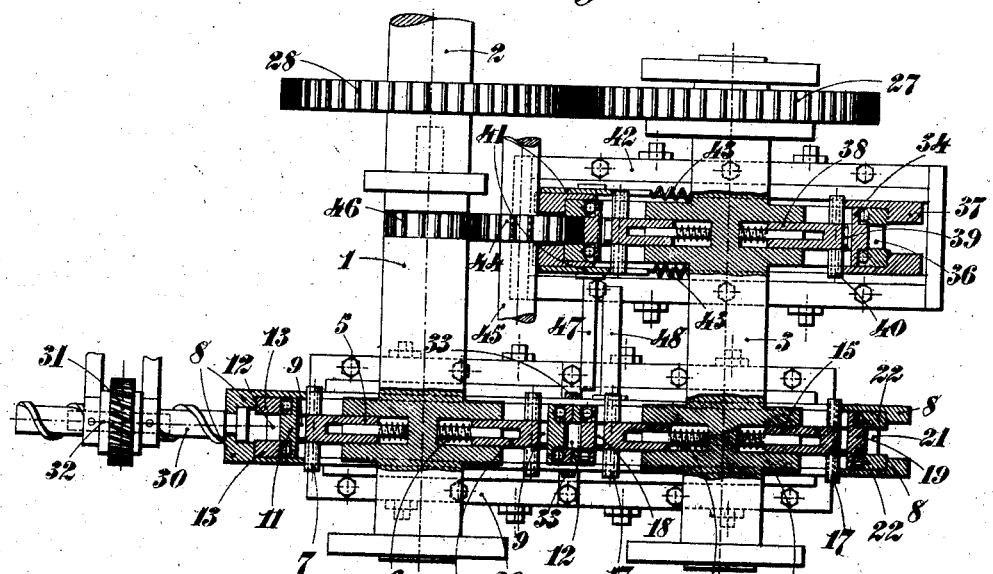
Figure 2:
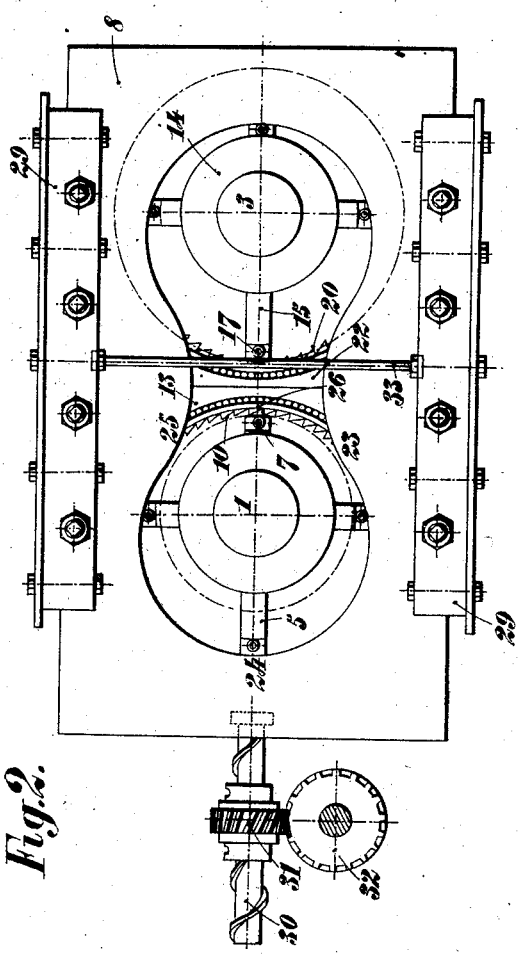
Figure 4:
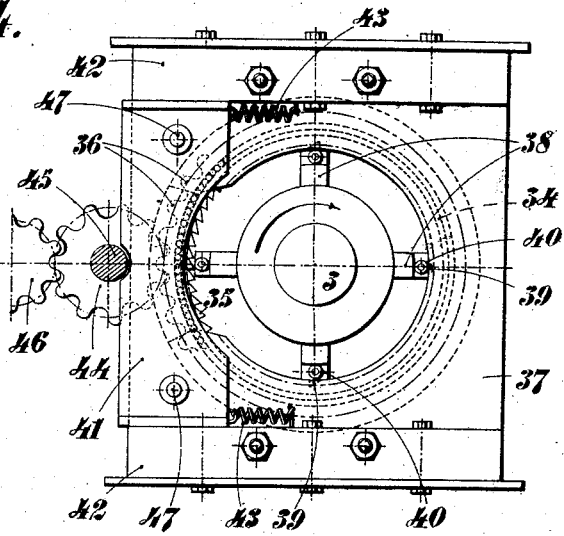
Figure 5:
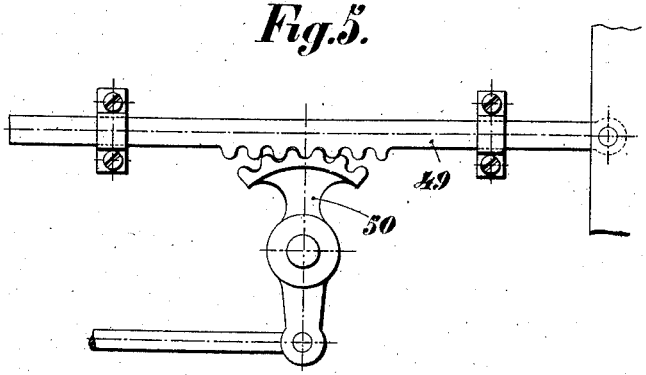

Figure 1 is a front view of the change speed mechanism. Fig. 2 is a similar view, the mechanism being in the situation corresponding to the small speed. Fig. 3 is a section through line A—A of Fig. 1. Fig. 4 is a front view of the reversing gear mechanism.
Fig. 5 is a modification of the change speed and reversing gear controlling mechanism.

The driving shaft 1 is assumed to rotate at constant speed like the shaft of a gas or spirit motor; it drives the driven shaft 2, which in the case here taken by way of example is arranged in line with the driving shaft, by the intermediary of a shaft 3 parallel with the other two shafts. The driving shaft 1 is provided with a sort of hub 4 provided with transverse cavities in which arms 5, which are constantly pressed towards the periphery by springs 6 bearing upon the bottom of the cavities, are able to slide. These arms, which may consist of round or polygonal rods, may be T-shaped, U-shaped, or of any other form insuring the necessary rigidity with a small weight. The horizontal branch of the T is provided with rollers 7 traveling on similar cam tracks formed in two parallel plates 8; the rollers being held against these tracks by means of the springs 6. The before-mentioned arms 5 terminate in pawls 9 adapted to engage with ratchet teeth 10 formed internally on a ring 11 surrounding the driving shaft 1 and which is likewise provided with external teeth 12. In order to insure a better engagement of the pawl rods with the internal ratchet teeth, each rod may terminate in several pawls instead of one. The ring 11 runs on ball bearings in two coaxial rings 13 which are let into the parallel plates 8 or formed upon them. The intermediate shaft 3 comprises similar parts: a hub 14, arms 15, springs 16, rollers 17 running on the cam tracks formed in the parallel plates 8 symmetrically with the first cam tracks, pawls 18, rings 19 with ratchet teeth 20 and gear teeth 21, ball bearing and crowns 22 in which these bearings run.

Referring again to the parts belonging to the driving shaft 1, the form of the cam tracks cut in the parallel plates 8 is such that during the portion 23, 24, 25 of the rotation of the arms 5, the rollers 7 run upon the said track; the pawls 9 are then separated from the ratchet teeth 10, while during the rest of the displacement of the arms (arc 25, 26, 23) the rollers leave the track and are pressed by the springs 6 until the pawls 9 engage with the ratchet teeth 10; in addition, the form of the tracks is such that when one of the pawls is about to leave a ratchet, the following pawl comes into engagement. It follows that the ring 11 rotates in a continuous manner with the driving shaft 1 and at the same angular velocity, driving the ring 19 of the intermediate shaft 3, the teeth 21 of which are always in mesh with the teeth 12 of the ring surrounding the driving shaft which ring is assumed to be centered thereon.

The rollers 17 of the arms 15 of the intermediate shaft 3 travel on cam tracks in the parallel plates 8 which are symmetrical with the tracks first mentioned, and the same effects are produced as with the driving shaft. The result is that, the driving shaft 1 rotating, will drive the ring 11 by the intermediary of the arms 5; the said ring by the intermediary of its teeth 12 will transmit its movement to the other ring 19, which will drive the intermediate shaft 3 by means of its arms 15. Keyed to this shaft and constantly in mesh with a gear wheel 28 keyed upon the driven shaft 2, is a pinion 27, by which the driven shaft 2 will therefore be rotated.

The variation of the velocity of the intermediate shaft 3, and consequently of the driven shaft 2, is obtained by simultaneously modifying the rotation radii of the rings with ratchet teeth 11 and 19. To this end the parallel plates 8 may be displaced in supporting rails 29 simultaneously and transversely of the shafts 1, 2 and 3, by means of an operating gear comprising a screw 30 and a pinion-nut 31 with helicoidal teeth in mesh with another pinion 32 operated by the driver. In this movement, the assemblage formed by the rings and the ball bearing follows the plates; the driving shaft 1 is approached by its ratchet ring 11 while the intermediate shaft 3 is separated from its ratchet ring 19 by an equal amount, or vice versa. Consequently, the spring arms 5 and 15 in mesh with these teeth are displaced equally and in opposite directions. When the two rings are centered, the arcs embraced by two successive arms are 90° (there are four arms) and the intermediate shaft 3 is driven at the same speed as the driving shaft 1. It should however be understood that any number of arms may be used.

If the parallel plates 8 are displaced towards the left hand, the arc embraced by two successive arms on the ring 11 decreases, while it increases on the other ring 19. The arms corresponding to the pawls 9 decrease in length in proportion as the parallel plates 8 are displaced towards the same direction; at the same time the arms 15 corresponding to the pawls 18 will increase in length. The speed of rotation of the intermediate shaft 3 will therefore diminish increasingly with the movement of the plates 8. If the displacement of the plates 8 continues, the rollers 17 of the arms 15 of the intermediate shaft 3 will encounter two rods 33 carried by the fixed rails 29, and these rods will disestablish the contact between the pawls 18 and the ratchet 19 by retaining the said rollers 17 in opposition to the action of the springs 16 which invariably tend to press the pawl-carrying arms towards the periphery. The intermediate shaft 3 will stop and the gear will occupy the disengaged position. If, starting from the position shown on Fig. 1, the plates 8 are displaced in the other direction to that above mentioned, the speed of the intermediate shaft 3 would have been increased instead of decreased, as the arms corresponding to the pawls 9 of the driving shaft 1 would have lengthened, while the length of the arms 15 corresponding to the pawls 18 of the intermediate shaft 3 would have decreased. From the disengaged position, the position giving the reversed rotation of the driven shaft, that is to say what is called the reverse in the case of vehicles, may be arrived at.

The reversing gear consists of a ring 34 with ratchet teeth 35 and external teeth 36 running by means of balls between two plates 37 with similar cam tracks. This assemblage surrounds the intermediate shaft 3 which carries arms 38 provided with springs, pawls 39 able to engage with the last mentioned ratchet and rollers 40 running on the cam tracks formed in the said plates 37. This cam track is completed by a cam track forming the arc of a circle formed in two other plates 41 capable of sliding in supporting rails 42, while remaining in contact with the first mentioned plates 37. Counter springs 43 tend to bring back the plates 41 in such a manner as again to impart the circular form to the recess. The teeth 36 mesh with a pinion 44 carried by a shaft 45; this pinion 44 likewise meshes with a pinion 46 mounted or formed upon the driving shaft 1. During the forward running, the plates 41 adapted for that purpose are arranged in such a manner as to complete the circular recess; the rollers 40 and the pawls 39 are separated from the ratchet 35; the driving shaft 1 drives the ring 34, but as this latter is separated from the intermediate shaft 3 it rotates loosely around it. The plates 41 are provided with tappets 47 against which other tappets 48 carried by the parallel plates 8 are able to bear. When the said parallel plates 8 have been caused to occupy the position corresponding to disengagement of the intermediate shaft 3, if the movement of the parallel plates 8 continues, the tappets 47 attached thereto will encounter the tappets 48 attached to the other plates 41 and displace these latter towards the left hand. One of the pawls 39 of the reversing gear engages with the ratchet 35 and the intermediate shaft 3 is driven by the driving shaft 1, but in the opposite direction to the foregoing. The movement is also transmitted to the driven shaft 2 by the train of gearing 27—28.

Instead of controlling the change speed and reversing gear by means of helicoidal and screw gearing, it may be controlled by a rack 49 actuated by a toothed sector 50 operated by the driver.

Instead of mounting the pawls upon arms sliding in the shaft and causing them to engage with a ratchet forming one with the pinion, they might inversely be mounted upon the pinion and caused to engage with a ratchet forming one with the shaft.

In the example of the application of this gear which is here given, it has been assumed that it was desired to drive a shaft mounted in line with the driving shaft; this is the case with motor road vehicles driven by Cardan shafts. This however is only one special case; the gear adapts itself to the connection of two parallel shafts arranged in any desired manner. The shaft 3 which has been considered as an intermediate shaft, might equally well be the shaft connected with the resistance. This gear is applicable to all cases in which it is desired to obtain progressive changes of speed without shocks, for example, in hoisting gear, lathes, motor road vehicles and so forth.

Having thus described and ascertained the nature of my invention and in what manner the same may be performed, I declare that what I claim is:

1. A change speed mechanism embodying driving and driven shafts, and coöperating revoluble elements shiftable transversely of the respective shafts, and operatively connected thereto by devices which effect differential speeds of the shafts according to the relative position occupied by the said elements.

2. A change speed gear embodying driving and driven shafts, a pair of coöperating gear elements, and means for proportioning the relative speeds of the shafts by variations of the eccentricity of the gear elements relatively to the respective shafts.

3. A change speed gear embodying driving and driven shafts, gear elements coöperating with one another and having ratchet and pawl connections with the respective shafts, and means for effecting simultaneous adjustments of both elements in directions transversely of the shafts.

4. A change speed gear embodying driving and driven shafts, a pair of coöperating gear elements having relatively fixed axes and adjustable transversely of the said shafts, and ratchet and pawl devices operatively connecting the gear elements and the respective shafts.

5. A change speed gear embodying driving and driven shafts, a pair of coöperating gear elements, ratchet and pawl devices for operatively connecting the said elements and the respective shafts, and devices for controlling the engagement of the said devices.

6. A change speed gear involving a pair of coöperating gear elements, ratchet and pawl devices for operatively connecting the said elements and the respective shafts, and cam tracks for the respective elements movable simultaneously and serving to control the operation of the ratchet and pawl devices.

7. A change speed gear embodying driving and driven shafts, a frame adjustable transversely of the shafts, a pair of coöperating gear elements revolubly mounted in the frame, ratchet and pawl devices for connecting the gear elements and the respective shafts, and cam tracks movable with the frame for controlling the operation of the ratchet and pawl devices.

8. A change speed gear embodying driving and driven shafts, a slidable frame, a pair of gear elements journaled therein, radially operable ratchet and pawl devices for connecting the gear elements and the respective shafts, and cam tracks on the frame for controlling the engagement and disengagement of the ratchet and pawl devices.

9. A change speed gear involving driving and driven shafts, radially operable pawls arranged to turn therewith, a slidable frame, a pair of coöperating annular gears journaled in the frame and having internal racks adapted to coöperate with the pawls of the respective shafts, and cam tracks adjustable with the frame and serving to control the engagement and disengagement of the pawls relatively to the respective racks.

10. A change speed gear involving driving and driven shafts, a pair of coöperating gear elements adjustable eccentrically of the respective shafts, ratchet and pawl devices for operatively connecting the gear elements and the respective shafts, and a device for wholly disengaging all of the ratchet and pawl devices of one gear element relatively to its respective shaft when the gear elements have been adjusted relatively to a predetermined point.

11. A power transmitting device embodying a shaft, a relatively transversely movable revoluble element, devices capable of connecting and disconnecting the shaft and revoluble element, and a cam movable with said element and arranged to successively engage and disengage the said devices for controlling the connection between the shaft and revoluble element.

12. A power transmitting device of the character described embodying a shaft, a revoluble element, radially movable devices carried by said shaft capable of connecting and disconnecting the shaft and the said element, and a controlling device embodying a cam adjustable radially of the revoluble element and successively engaging said radially movable devices for controlling the operation of the said devices.

13. A power transmitting mechanism embodying a shaft, a revoluble gear element centered axially thereof and provided with a circular rack, a set of radially operable pawls movable with the shaft and arranged to coöperate with the rack on the gear element, and a cam adjustable radially of the gear element controlling the engagement of the pawls with the rack gear element.

14. A change speed and reversing gear mechanism embodying driving and driven shafts, a pair of coöperating gear elements, devices capable of connecting and disconnecting the gear elements and the respective shafts, controlling means for the connecting devices adjustable transversely of the said shafts, a reversing gear element centered axially of one of the shafts, gearing connecting the reversing gear element to the driving shaft devices for connecting and disconnecting the reversing gear element and the driven shaft, and a device adjustable in a plane transverse to said shafts and operated by the controlling means for the connecting devices first mentioned for setting the connecting devices of the reversing gear element into operation.

15. A change speed and reversing gear mechanism embodying driving and driven shafts, a frame adjustable transversely thereof, a pair of coöperating gear elements journaled in the frame, devices capable of connecting and disconnecting the gear elements relatively to the respective shafts, cam tracks on the frame for controlling the operation of the connecting devices, a reversing gear element mounted on one of the shafts, gearing for connecting the reversing gear element to the driving shaft devices for connecting and disconnecting the reversing gear element relatively to the driven shaft, and a controlling device for the connecting devices of the reversing gear element operable by the movement of the said frame.

16. A change speed gear involving driving and driven shafts, a slidable frame, a pair of coöperating gear elements journaled therein, devices operably connecting the gear elements and the respective shafts for varying the relative speeds of the latter according to the position occupied by the frame, and an operating device for the sliding frame.

17. A change speed mechanism involving driving and driven shafts, a slidable frame adjusted transversely thereof, a pair of coöperating gear elements journaled in the frame, devices operably connecting the gear elements and the respective shafts for varying the relative speeds of the latter according to the positions occupied by the frame, and a device connected to the said frame for shifting the latter transversely of the shafts for simultaneously varying the relation of the gear elements and the respective speed changing devices.

In testimony whereof I have hereunto set my hand in presence of two subscribing witnesses.

LOUIS AUGUSTE MAGOUT.

Witnesses:
  EMILE KLOTZ,
  GEORGES LEDAY.